2,487,609

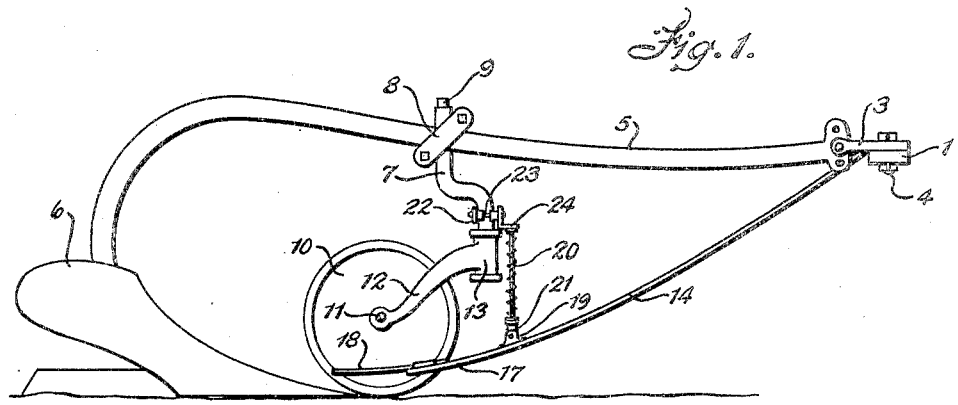
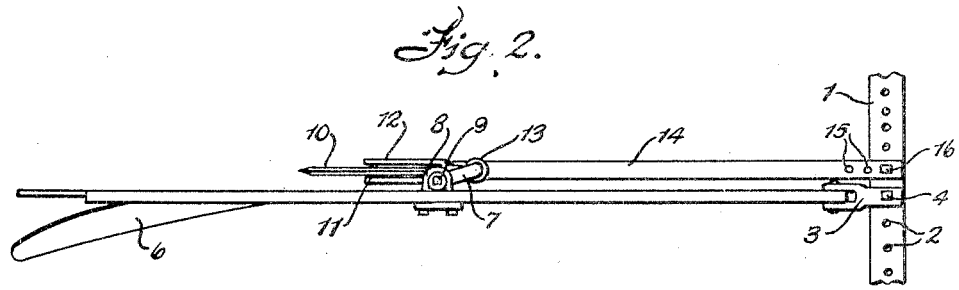
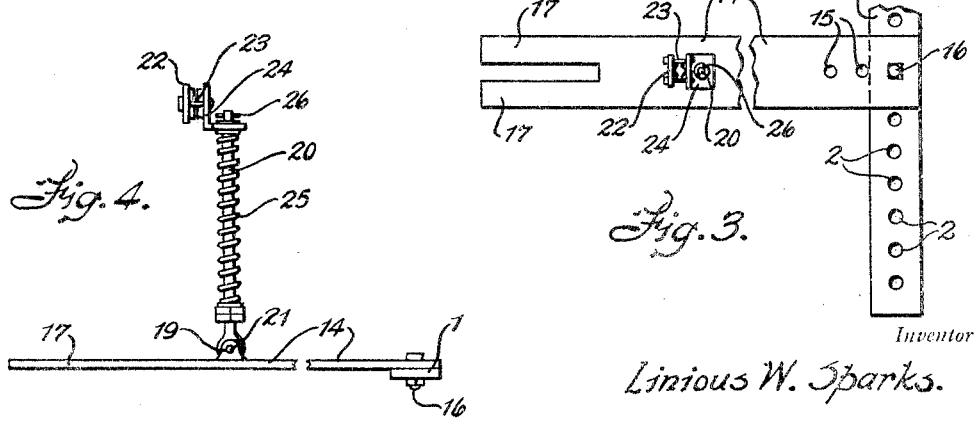
Inventor
Linious W. Sparks.
By Clarence A. O'Brien
and Harvey B. Jacobson
Attorneys Patented Nov. 8, 1949

UNITED STATES PATENT OFFICE 2,487,609

STUBBLE CONTROLLER

Linious W. Sparks, Mohler, Idaho

Application March 25, 1946, Serial No. 656,933

4 Claims. (Cl. 97—208)

This invention relates to improvements in plow attachments, and more particularly to a stubble controller operated in conjunction with and supported by the beam of a plow.

An object of the instant invention is to provide an improved colter or cutting disc for holding down and cutting straw, sweet clover or pea vines, etc., and cutting up the same before it is plowed under by a plow operated in conjunction with the colter.

Another object of the invention is to provide an improved form of resiliently tensioned adjustably supported colter or cutting disc used for cutting and controlling stubble, said colter being supported on a plow beam and having means for controlling the distance of the presser bar from the ground, and further means for adjusting the resilient tension on said presser bar.

A further object of the invention is to provide a plurality of colter or cutting discs for a gang of plows, said plow beams being attached to a suitable draw bar, and said colters being supported on said plow beams with cooperating spring tensioned presser bars connected with the draw bar and having adjustable resilient tensioning means between the presser bars and the supporting stems for said colters.

A still further object of the invention is to provide an improved colter device or stubble controller which will be highly efficient in operation, and relatively inexpensive to manufacture and produce.

Other objects will appear as the description proceeds.

In the accompanying drawings which form a part of this application,

Figure 1 is a side elevation of a plow with the improved colter or stubble controller attached thereto;

Figure 2 is a top plan view of the plow and attached colter or stubble controller;

Figure 3 is a plan view of the presser bar for the colter or stubble controller, and Figure 4 is a side elevation of the resilient tensioning means for the presser bar.

Like characters of reference are used throughout the following specification and the accompanying drawings to designate corresponding parts.

In carrying out the instant invention, there is provided a draw bar 1 having a plurality of spaced openings 2 formed therein for adjustably supporting one or more plows and colters or stubble controlling devices.

A clevis 3 is secured by the bolt 4 to the draw bar 1, and supports the forward end of a plow beam 5 of a plow 6.

The improved colter or stubble controlling device includes a crank supporting shaft 7 supported by the U-shaped clamp 8 on the plow beam 5, the upper end of said shaft 7 being squared as at 9 to be engaged by a wrench (not shown) for rotatably adjusting the position of the colter or cutting disc with respect to the plow 6.

The colter or cutting wheel 10 is supported on a shaft or axle 11 between the bifurcated arms 12 of the bracket member or head 13, which is supported on the lower end of the crank supporting shaft 7.

A spring steel presser bar 14 is formed with a plurality of apertures 15 through its forward end, and is adjustably supported on the draw bar 1 and secured thereto by the bolt 16. The bar 14 extends rearwardly under the plow beam 5 and is bifurcated at its rear end to form the spring presser fingers 17 between which the colter or cutting disc 10 is adapted to operate.

If it is desired, a stubble rod 18 may be attached to the rear end of the presser bar 14 to extend rearwardly therefrom to further press the vines and stubble, etc., down in a position to be cut by the colter or cutting disc 10.

A bracket having spaced ears 19 will be secured to the upper surface of the presser bar 14, and will pivotally support the lower end of the rod 20 on a pin 21 extending between said ears and through an eye in said rod. A clamping bracket support for the upper end of the rod 20 comprises a clamp 22 secured by bolts 23 on the crank supporting shaft 7, and is formed with the L-shaped laterally extending arm 24, which is apertured to permit the upper end of the rod 20 to pass therethrough. The coil tensioning spring 25 will be positioned about the rod 20 between the bracket ears 19 and the arm 24, and a cotter pin or key 26 will be inserted through a cross opening or bore in the extreme upper end of the rod 20 above the bracket arm 24, thereby securing and supporting the several associated parts in operative position.

It will be understood that a plurality of plows and colters or stubble controllers may be supported in adjustable position on the draw bar 1, and that the resilient tension on the presser bar 14 may be varied as desired, depending upon the amount and growth of stubble or vines, etc., which are to be cut up and plowed under.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In combination with a draw bar and plow beam attached thereto, of a stem attached to said plow beam, a head member secured on the lower end of said stem and formed with bifurcated arms, a colter or cutting disc mounted between said arms, a presser bar adjustably attached at one end to said draw bar and formed with a bifurcated rear end positioned on the opposite sides of said colter or cutting disc for causing said colter or cutting disc to track within fixed lateral limits, and an adjustable resilient connection between said presser bar and stem.

2. In combination with a transversely disposed perforated draw bar and plow beam attached thereto, of a stem attached to said plow beam, a head member secured on the lower end of said stem and formed with bifurcated arms, a colter or cutting disc mounted between said arms, a presser bar having an apertured front end adapted for adjustable attachment to said draw bar and formed with a bifurcated rear end positioned on the opposite sides of said colter or cutting disc for limiting the lateral movement of said colter or cutting disc, and means for resiliently sustaining said presser bar in close proximity with the ground.

3. In combination with a draw bar and plow beam pivotally and adjustably attached thereto, of a stem adjustably attached to one side of said plow beam, a head member secured on the lower end of said stem and formed with bifurcated arms, a colter or cutting disc journalled between said arms, a spring presser bar adjustably attached at one end to said draw bar and formed with a bifurcated opposing end positioned on the opposite sides of said colter or cutting disc, a stubble rod removably attached to the opposing end of said presser bar, and adjustably tensioned resilient means connected between said presser bar and said stem.

4. In combination with a draw bar and plow beam attached thereto, of a stem attached to said plow beam, a head member secured on the lower end of said stem and formed with bifurcated arms, a colter pivotally mounted between said arms, a presser bar detachably and adjustably secured at its front end to said draw bar and having a bifurcated rear end, said bifurcations or branches being disposed on the opposing sides of the colter for limiting the pivotal movement of the colter, a stubble rod removably carried by the rear end of the presser bar, a bracing rod pivotally and movably connected between the presser bar and stem and resilient means disposed on said rod for normally urging said presser bar downwardly.

LINIOUS W. SPARKS.

REFERENCES CITED

The following references are of record in the file of this patent:

UNITED STATES PATENTS

| Number | Name | Date |
|---|---|---|
| 960,628 | Davis | June 7, 1910 |
| 2,161,714 | Lindelof | June 6, 1939 |